(12) United States Patent
Booth et al.

(10) Patent No.: US 7,720,135 B2
(45) Date of Patent: May 18, 2010

(54) SYSTEM, METHOD AND DEVICE FOR AUTONEGOTIATION

(75) Inventors: Bradley J. Booth, Austin, TX (US); Luke Chang, Aloha, OR (US); Ilango S. Ganga, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 10/801,504

(22) Filed: Mar. 15, 2004

(65) Prior Publication Data

US 2005/0111531 A1   May 26, 2005

Related U.S. Application Data

(63) Continuation-in-part of application No. 10/291,017, filed on Nov. 7, 2002, now abandoned.

(51) Int. Cl.
*H04B 1/38* (2006.01)

(52) U.S. Cl. .................. 375/219; 370/296; 370/389; 370/397; 370/433; 710/58

(58) Field of Classification Search ............ 370/296, 370/389, 397, 433; 710/58
See application file for complete search history.

(56) References Cited

U.S. PATENT DOCUMENTS

| | | | |
|---|---|---|---|
| 5,627,836 A * | 5/1997 | Conoscenti et al. | 370/397 |
| 5,805,597 A | 9/1998 | Edem | |
| 5,889,776 A * | 3/1999 | Liang | 370/389 |
| 5,907,553 A * | 5/1999 | Kelly et al. | 370/433 |
| 6,169,729 B1 * | 1/2001 | Feuerstraeter | 370/296 |
| 6,198,727 B1 | 3/2001 | Wakeley et al. | |
| 6,215,184 B1 | 4/2001 | Stearns et al. | |
| 6,215,816 B1 | 4/2001 | Gillespie et al. | |
| 6,222,852 B1 | 4/2001 | Gandy | |
| 6,345,345 B1 | 2/2002 | Yu et al. | |
| 6,349,331 B1 | 2/2002 | Andra et al. | |
| 6,359,893 B1 | 3/2002 | Mills | |
| 2001/0009533 A1 | 7/2001 | Homann | |
| 2001/0009553 A1 | 7/2001 | Homann | |
| 2001/0034729 A1 | 10/2001 | Azadet et al. | |

(Continued)

FOREIGN PATENT DOCUMENTS

JP       10304004       11/1998

(Continued)

OTHER PUBLICATIONS

Taiwan *Office Action* (*Translation*), Appln No. 092131067,(2005), 1 page.

(Continued)

*Primary Examiner*—David C Payne
*Assistant Examiner*—Adolf Dsouza

(57) ABSTRACT

Disclosed are a system, method and device for negotiating a data transmission mode over an attachment unit interface (DDI). A data transceiver circuit may be coupled to one or more data lanes of the DDI. A negotiation section may receive a link pulse signal on at least one data lane in the DDI during a negotiation period and selectively configure the data transceiver to transmit and receive data on one or more data lanes according to a data transmission mode based upon the received link pulse signal.

5 Claims, 5 Drawing Sheets

U.S. PATENT DOCUMENTS

| | | | |
|---|---|---|---|
| 2002/0091884 A1* | 7/2002 | Chang et al. ............... | 710/58 |
| 2002/0123365 A1 | 9/2002 | Thorson et al. | |
| 2004/0001579 A1 | 1/2004 | Feinberg et al. | |
| 2004/0091027 A1 | 5/2004 | Booth | |
| 2004/0247313 A1 | 12/2004 | Tanaka | |
| 2005/0111531 A1 | 5/2005 | Booth et al. | |

FOREIGN PATENT DOCUMENTS

| | | |
|---|---|---|
| JP | 2003087261 | 3/2003 |
| JP | 2003087276 | 3/2003 |
| TW | 1236237 | 7/2005 |
| WO | 2004045181 | 5/2004 |
| WO | 2005091569 A1 | 9/2005 |

OTHER PUBLICATIONS

*International Search Report and Written Opinion of the International Searching Authority, Dated* Jun. 10, 2004: PCT/US2005/008607; 14 Pages, 14.

"PCT Search Report", *PCT/US2003/34160*, (2003),11 pages.

Baek, S. et al., "Increased Radiation Emissionand Impedance Change by Edge Placement of High Speed Differential Lines on Printed Circuit Board", IEEE International Symposium on Electromagnetic Compatibility, 1. Aug. 19, 2002, pp. 200-204.

Lund, Martin et al., "Going Serial in Gigabit Ethernet Designs", Broadcom Corp., CommsDesign.com. Dated Jun. 20, 2002. Retrieved from http://www.commsdesign.com/story/OEG20020620S0004. 7 pages.

Office Action Received for Taiwanese Patent Application No. 092131067 mailed Dec. 17, 2004. 3 pages.

Office Action for European Patent Application No.03779361.9 mailed Nov. 6, 2007. 4 pages.

Office Action Received for U.S. Appl. No. 10/291,017 mailed Nov. 1, 2006. 19 pages.

Office Action Received for U.S. Appl. No. 10/291,017 mailed May 9, 2006. 22 pages.

International Search Report and Written Opinion issued in PCT Patent Application No. PCT/US 2003/0034160, (Jul. 27, 2004), 8 Pages.

International Preliminary Report on Patentability issued in PCT Patent Application No. PCT/US 2005/008607, (Sep. 28, 2006), 9 pages.

Chinese Office Action received for Chinese Patent Application No. 200580005349.3, (Mar. 14, 2008), 31 Pages.

International Search Report and Written Opinion issued in PCT Patent Application No. PCT/US 2005/008607, (Jun. 10, 2005), 14 Pages.

Office Action received for U.S. Appl. No. 10/291,017 mailed on Feb. 23, 2009.

Summary of Office Action Received for Japanese Patent Application No. 2007-504035, mailed on May 12, 2009, 2 pages.

* cited by examiner

SYSTEM, METHOD AND DEVICE FOR AUTONEGOTIATION

This is a continuation-in-part of U.S. patent application Ser. No. 10/291,017 filed on Nov. 7, 2002 now abandoned.

BACKGROUND

1. Field

The subject matter disclosed herein relates to interfaces between devices. In particular, the subject matter disclosed herein relates to devices capable of transmitting or receiving data in one or more data transmission mode.

2. Information

Data transmitted in a transmission medium between devices is typically transmitted according to a data link protocol that depends on the particular transmission medium. For a particular transmission medium, devices may transmit or receive data according to more than one data transmission mode. Also, particular devices are capable of transmitting data in a transmission medium according to more than one data transmission mode. Devices coupled by a transmission medium may engage in an "autonegotiation" procedure whereby the devices agree on a common data transmission mode to be used in transmitting data between the devices.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
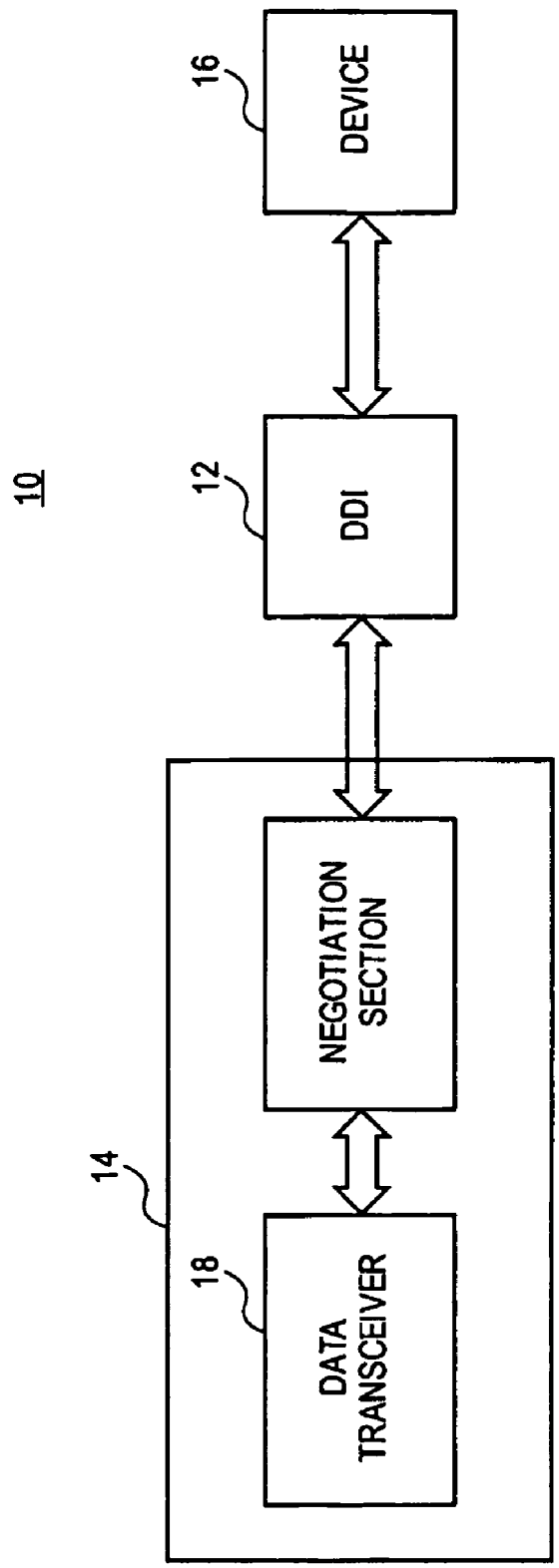
FIG. 1 shows a diagram illustrating a system capable of negotiating a data transmission mode between devices according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions or data. Such storage devices may comprise storage media such as, for example, optical, magnetic or semiconductor storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

A "device-to-device interconnection" (DDI) as referred to herein relates to a data link to transmit data between devices coupled to a common circuit board. For example, a DDI may be formed by conductive traces formed on a circuit board between device sockets to receive devices. However, this is merely an example of a DDI and embodiments of the present invention are not limited in this respect.

A data link formed in a DDI may comprise a plurality of "data lanes" where each data lane transmits data from a source to a destination independently of other data lanes. Each data lane in a data link may transmit symbols in a transmission medium which are decoded into data bits at a destination. However, this is merely an example of data lanes that may be used to transmit data in a DDI and embodiments of the present invention are not limited in these respects.

A "link pulse signal" as referred to herein relates to a signal transmitted on a data link between devices comprising a series of signaling pulses. A link pulse signal may transmit information which is encoded in pulses transmitted at uniform intervals. For example, a "fast link pulse signal" may comprise alternating clock and data pulse signals transmitted at a pulse repetition frequency. However, these are merely examples of a link pulse signal and embodiments of the present invention are not limited in these respects.

A "data transceiver" as referred to herein relates to a device that is capable of transmitting data to and receiving data from a transmission medium. For example, a data transceiver may comprise circuitry or logic for attaching the data transceiver to a transmission medium, encoding signals for transmission on the transmission medium and decoding signal received from the transmission medium. However, this is merely an example of a data transceiver and embodiments of the present invention are not limited in this respect.

A data transceiver may be capable of transmitting or receiving data in one or more "data transmission modes" relating to format by which data may be transmitted in a transmission medium. For example, a data transmission mode may be characterized by one or more of an encoding format, link speed or data rate, and data lane numbering (e.g., for transmitting and receiving data in a multi data lane data link). However, these are merely examples of how a data transmission mode may be characterized and embodiments of the present invention are not limit in these respects.

A "physical medium attachment" (PMA) section as referred to herein relates to circuitry or logic adapted to be coupled to a transmission medium for transmitting and receiving data according to a data transmission mode. For example, a PMA section may comprise circuitry or logic to perform collision detection, clock and data recovery, and/or alignment of skewed data lanes. However, these are merely examples of tasks that may be performed by a PMA section and embodiments of the present invention are not limited in these respects.

A "physical coding sublayer" (PCS) section as referred to herein relates to circuitry or logic to encode data to be transmitted in a transmission medium, or decode data received from a data transmission medium. For example, a PCS section may be adapted to decode data recovered from a PMA section according to a data transmission mode. Also, a PCS section may encode data to be transmitted by a PMA according to a data transmission mode. However, these are merely examples of a PCS section and embodiments of the present invention are not limited in these respects.

An "8B/10B encoding scheme" as referred to herein relates to a process by which eight-bit data bytes may be encoded into ten-bit "code groups" (e.g., 8B/10B code groups), or a process by which ten-bit code groups may be decoded to eight-bit data bytes according to a predetermined "8B/10B code group mapping."

A "negotiation period" as referred to herein relates to a period during which a data transmission mode may be selected for transmitting data on a data link. During a negotiation period, for example, data transceivers coupled to a data link may exchange information identifying data transmission capabilities. Based upon the exchanged information, the data transceivers may select a common data transmission mode to be used in transmitting data between the devices following the negotiation period. However, this is merely an example of a negotiation period and embodiments of the present invention are not limited in this respect.

A "Base Page" message as referred to herein relates to a message that may be transmitted between devices over a data link during a negotiation period. Such a Base Page message may identify one or more capabilities of the transmitting device. Transmission of a Base Page message may be followed by transmission of a "Next Page" message which may identify additional capabilities of the transmitting device. Examples of the use of Base Page and Next Page messages may be found in IEEE Std. 802.3-2000, Clause 28. However, these are merely examples of Base Page and Next Page messages, and embodiments of the present invention are not limited in these respects.

Briefly, an embodiment of the present invention relates to a method and device for negotiating a data transmission mode over a DDI. A data transceiver circuit may be coupled to one or more data lanes of the DDI. In response to one or more link pulse signals on the DDI during a negotiation period, the data transceiver may be selectively configured to transmit and receive data on one or more data lanes according to a data transmission mode based upon the received one or more link pulse signals. However, this is merely an example embodiment and other embodiments of the present invention are not limited in these respects.

FIG. 1 shows a diagram illustrating a system 10 capable of negotiating a data transmission mode according to an embodiment of the present invention. Devices 14 and 16 coupled by a DDI 12 may be configured to communicate in one or more data transmission modes. During a negotiation period, devices 14 and 16 may communicate to determine one or more possible common data transmission modes to be used in transmitting data between the devices 14 and 16. A common data transmission mode may then be selected and the devices 14 and 16 may be configured to transmit or receive data according to the selected data transmission mode.

According to an embodiment, the DDI 12 may comprise a plurality of data lanes (not shown) formed in copper traces of a printed circuit board (not shown). However, this is merely an example of how data lanes may be formed in a DDI and embodiments of the present invention are not limited in this respect. Each data lane may transmit or receive data in one or more differential signaling pairs. However, this is merely an example of how data may be transmitted in a data lane and embodiments of the present invention are not limited in this respect.

For full-duplex communication, a data lane may comprise two differential signaling pairs (e.g., one differential signaling pair for transmitting data from a device and one differential signaling pair for receiving data at the device). Alternatively, a data lane may comprise a single differential signaling pair for communicating in a half-duplex operating mode. However, this is merely an example of how full or half duplex communication may be implemented using differential signaling pairs and embodiments of the present invention are not limited in these respects.

According to an embodiment, the device comprises a data transceiver 18 and a negotiation section 20. The data transceiver 18 may comprise a physical media dependent (PMD) interface, circuitry or logic to transmit or receive data through data lanes in the DDI 12 such as, for example, couplings to differential pair conductors formed in the DDI 12. Coupled to the PMD circuitry, the data transceiver 18 may also comprise a PMA section and PCS section as provided in IEEE Std. 802.3ae-2002, clause 48 or IEEE Std. 802.3-2000, clause 36. However, these are merely examples of how a data transceiver may implement PMA and PCS sections and embodiments of the present invention are not limited in these respects.

According to an embodiment, the data transceiver 18 may be coupled to other devices in any one of several data communication systems or input/output architectures. For example, a PCS of the data transceiver 18 may comprise a media independent interface (MII) for coupling to other devices such as a media access controller (MAC). Such a MAC may be couple the data transceiver 18 to any one of several other I/O devices such as, for example, a multiplexed data bus or a multi-port switch fabric. The MAC may also couple the data transceiver 18 to one or more packet classification devices (e.g., for network protocol processing) such as a network processor or packet classification ASIC. However, these are merely examples of devices that may be coupled to a data transceiver through a MAC and embodiments of the present invention are not limited in these respects.

In another embodiment, a PCS of the data transceiver 18 may comprise an MII coupled to a physical layer communication device for transmitting and receive data in a transmission medium such as, for example, coaxial, fiber optic or twisted wire pair cabling. However, these are merely examples of data transmission media that may be used for transmitting data from or receiving data at a MII and embodiments of the present invention are not limited in these respects.

According to an embodiment, the data transceiver 18 may be configured to transmit data to or receive data from the DDI 12 according to one or more data transmission modes. For each of such data transmission modes, the data transceiver 18 may comprise an associated PMA section and/or PCS section capable of transmitting or receiving data according to the data transmission mode. Accordingly, the data transceiver may comprise a plurality of PMA and/or PCS sections and logic to selectively enable a PMA section and/or PCS section based upon a selected data transmission mode.

A negotiation section 20 communicates with the device 16 to determine the capability of the device 16 in transmitting or receiving data in the DDI 12 according to one or more data transmission modes. The negotiation section 20 may then select a data transmission mode which is common among the capabilities of the data transceiver 18 and the device 16. The negotiation section may then configure the data transceiver 18 to transmit or receive data through the DDI 12 according to the selected data transmission mode, and couple the data transceiver 18 to the device 16 through the DDI 12.

According to an embodiment, the system 10 may be used in as part of an end-to-end infrastructure for providing ATM services to subscriber clients. For example, the system 10 may be included as part of a distribution node coupled to an ATM network capable of providing one or more ATM services to one or more subscriber client terminals. Here, the system 10 may be coupled to the ATM network by a high speed optical data link capable of transmitting interleaved ATM cells (such as an Ethernet or Synchronous Optical NETwork (SONET) link capable of transmitting interleaved ATM cells in SONET frames) to support one or more ATM services (e.g., voice data, video data or Internet data) to one or more subscriber clients. In one embodiment, for example, the device 14 or device 16 may be included on a line card coupled to the high speed optical data link. However, this is merely an example of how a distribution node may be coupled to an ATM network and embodiments of the present invention are not limited in these respects. A subscriber client terminal (e.g., personal computer, set-top box, hand held wireless device, broadband modem, etc.) may be coupled to other component boards by any one of several types of data links capable of transmitting ATM cells such as, for example, DSL links, wireless links or Ethernet over unshielded twisted wire pair. In one embodiment, for example, the device 14 or device 16 may be included on a line card coupled to the subscriber client terminal through the data link. However, these are merely examples of how a subscriber client terminal may be coupled to a distribution node and embodiments of the present invention are not limited in these respects.

Figure 2:
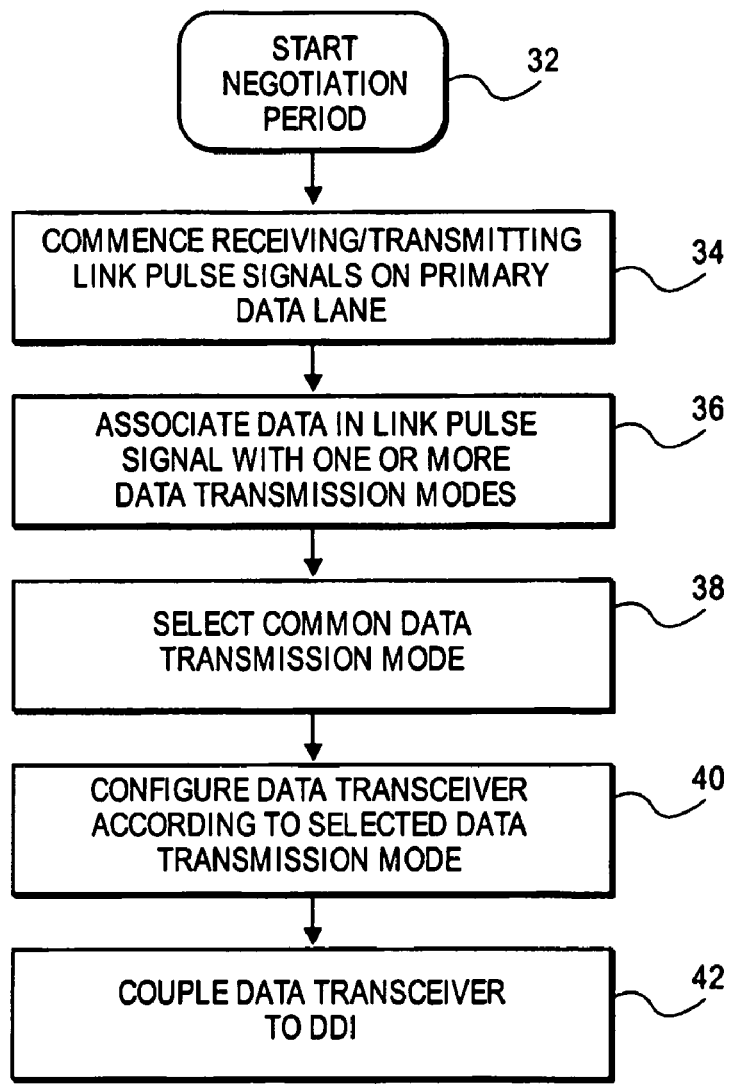
FIG. 2 shows a flow diagram illustrating a process of negotiating a data transmission mode in data lanes of a device-to-device interconnection (DDI) using link pulses according to an embodiment of the system shown in FIG. 1.

FIG. 2 shows a flow diagram illustrating a process 30 of negotiating a data transmission mode in one or more data lanes of a DDI using link pulse signals according to an embodiment of the negotiation section 20 shown in FIG. 1. The process 30 may be implemented in logic using techniques known to those of ordinary skill in the art of digital logic and circuit design. At bubble 32, a negotiation period may commence in response to an event such as, for example, a link restart or power up. However, these are merely examples of events that may initiate a negotiation process between devices coupled by a data link and embodiments of the present invention are not limited in these respects.

According to an embodiment, the devices 14 and 16 may transmit and receive link pulse signals transmitted on differential signaling pairs in the DDI 12. For example, the negotiation section 20 of the device 14 may transmit and receive link pulse signals as described in IEEE Std. 802.3-2000, clauses 28.2.1.1 and 28.2.2.1. While IEEE Std 802.3-2000 clauses 28.2.1.1 and 28.2.2.1 refer to signaling over a twisted pair cable medium, the teachings of IEEE Std. 802.3-2000, clauses 28.2.1.1 and 28.2.2.1 may be applied to transmitting and receiving link pulse signals (including normal link pulse (NLP) signals or fast link pulse (FLP) signals) over differential signaling pairs formed in a DDI (e.g., differential signaling pairs by copper traces in a printed circuit board) without substantial modification.

It should be understood that either the device 14 or 16 may be capable of transmitting data in either one or more than one data lane in the DDI 12. At block 34, according to an embodiment, link pulse signals transmitted between the device 14 and device the device 16 may be transmitted in a predetermined "primary" data lane in the DDI 12. For example, the devices 14 and 16 may each be coupled to a transmit differential signaling pair and a receive differential signaling pair in the primary data lane. Accordingly, the devices 14 and 16 may exchange link pulse signals over the primary data lane independently of whether either device 14 or 16 is capable of transmitting data over one or more than one data lane.

The devices 14 and 16 may exchange messages encapsulated in the link pulse signals such as a Base Link Code Word as provided in IEEE Std. 802.3, clause 28.2.1.2 followed by one or more Next Page Messages as provided in IEEE Std. 802.3, clause 28.2.3.4. Among other things, the Base Link Code Word and Next Page Messages may indicate capabilities of a transmitting device to operate in one or more data transmission modes to a recipient device. In response to receipt of the encapsulated messages from device 16, at block 36 the negotiation section 20 may associate the capabilities of the device 16 with the capabilities of the data transceiver 18 to identify one or more common data transmission modes (i.e., data transmission modes which may be used by both devices 16 and 18 to transmit data between one another in the DDI 12) as provided in IEEE Std. 802.3-2000, clause 28.2.3.

At block 38, the negotiation section 20 may select from among more than one common data transmission mode. For example, the negotiation section 20 may arbitrate among multiple common data transmission modes to select a "highest common denominator" according to an a priori priority scheme as provided in IEEE Std. 802.3-2000, clause 28.2.3.

At block 40, the negotiation section 20 may configure the data transceiver 18 to transmit and/or receive data over the DDI 12 using the selected common data transmission mode (e.g., a highest common denominator data transmission mode). For example, the negotiation section 20 may comprise a Technology-Dependent Interface (TDI) with a PMA section and/or PCS section of the data transceiver 18 associated with the selected data transmission mode according to IEEE Std. 802.3-2000, clause 28.2.6. The negotiation section 20 may communicate with the PMA section and/or PCS section of the selected data transmission mode over the TDI to enable the PMA section and/or PCS section. However, this is merely an example of how a data transceiver may be configured to transmit or receive data according to a data transmission mode and embodiments of the present invention are not limited in these respects.

Following configuration of the data transceiver 18 according to the selected data transmission mode, at block 42 the data transceiver 18 may be coupled to the DDI 12 to communicate with the device 16 according to a Transmit Switch Function as provided in IEEE Std. 802.3-2000, clause 28.2.1.3 (e.g., coupling one or more transmitting differential pairs) and a Receive Switch Function IEEE Std. 802.3-2000, clause 28.2.2.3 (e.g., coupling one or more receiving differential pairs). However, this is merely an example of how a data transceiver may be coupled to a transmission medium following configuration of a data transmission mode and embodiments of the present invention are not limited in these respects.

While FIGS. 1 and 2 refer to a data transceiver 18 and negotiation section 20 in device 14, it should be understood that the device 16 may similarly comprise a data transceiver (not shown) which is capable of communicating in the DDI 12 according to one or more data transmission modes. The device 16 may also comprise a negotiation section (not shown) to communicate with the negotiation section 20 for selecting a common data transmission mode (and configuring the data transceiver to transmit and receive data according to the common data transmission mode) by executing the process 30 shown in FIG. 2.

Figure 3:
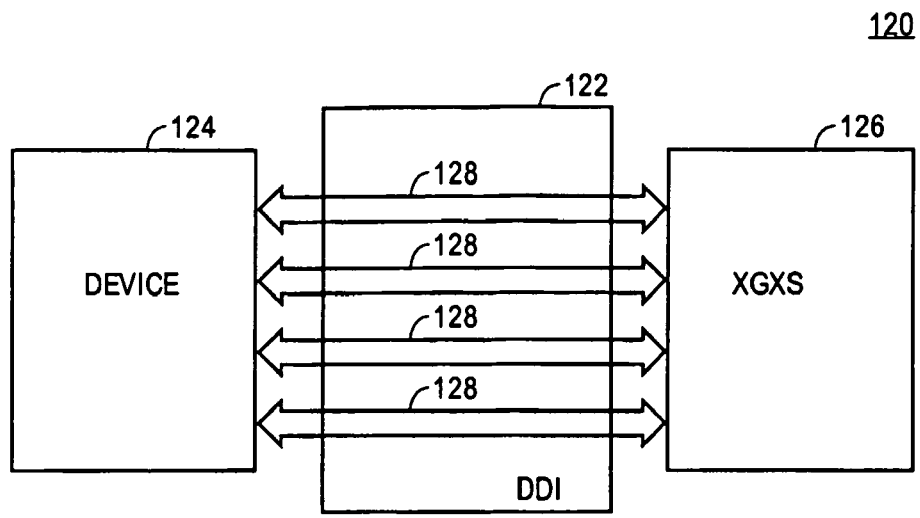
FIGS. 3 through 5 show schematic diagrams illustrating devices capable of negotiating a mode of data transmission in data lanes of a DDI according to alternative embodiments of the present invention shown in FIGS. 1 and 2.
Figure 4:
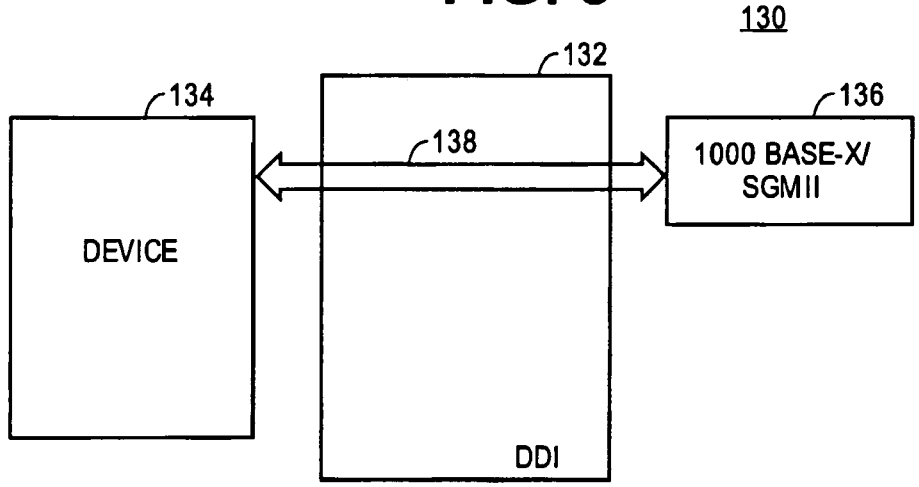
Figure 5:
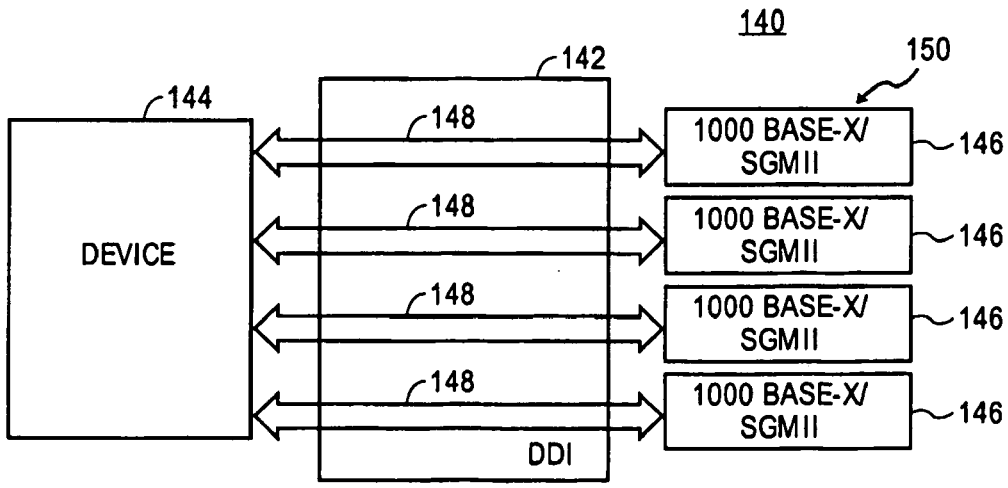

FIGS. 3 through 5 schematic diagrams illustrating devices capable of negotiating a mode of data transmission in data lanes of a DDI according to alternative embodiments of the present invention illustrated in FIGS. 1 and 2. A system 120 shown in FIG. 2 comprises devices 124 and 126 coupled by data lanes 128 in a DDI 122. In the presently illustrated embodiment, either or both of the devices 124 and 126 may be capable of being configured to communicate according to one or more data transmission modes. For example, the devices 124 and 126 may each comprise one or more combinations of a PMA and PCS sections including a combination of a PMA and PCS sections to operate as a Ten Gigabit Media Independent Interface Extender Sublayer (XGXS) device according to IEEE Std. 802.3ae-2002, Clause 47. Accordingly, the DDI 122 may comprise a Ten Gigabit Attachment Unit Interface (XAUI) coupling devices 124 and 126 as XGXS devices. It should be understood, however, that either of the devices may also have a combination of a PMA and PCS section to enable a 1000BASE-X data transmission mode according to IEEE Std. 802.3-2000, clause 36 (where each PMA attaches to a transmit differential signaling pair and a receive differential signaling pair), a Serial Gigabit Media Independent Interface (SGMII) data transmission mode according to a SGMII signaling format proposed by Cisco Systems, Inc., or other data transmission mode.

During a negotiation period as outlined above with reference to FIG. 2, data transmission as XGXS devices over a XAUI may be selected as the "highest common denominator" data transmission mode between the devices 124 and 126 as indicated in Next Page Messages. As such, PMA and PCS sections of the devices 124 and 126 may be capable of this selected data transmission mode. Accordingly, the devices 124 and 126 may be configured as XGXS devices communicating over a XAUI. Next Page Messages may also be used during a negotiation period to determine lane numbering on the XAUI between the devices 124 and 126.

FIG. 4 shows a system 130 comprising devices 134 and 136 coupled by data lane 138 in a DDI 132 according to an embodiment. In the presently illustrated embodiment, the device 134 may be selectively configured to operate in any of a plurality of operating modes such as, for example, a XGXS operating mode to communicate as an XGXS device to another XGXS device over data lanes in a XAUI, a single port data transmission mode to communicate with a single port device over a single data lane. The device 136 may be selectively configured to operate in one or more single port data transmission modes to communicate with a single port device over a single data lane. Such a single port operating mode may include, for example, a 1000BASE-X data transmission mode according to IEEE Std. 802.3-2000, clause 36 or an SGMII data transmission mode according to the aforementioned SGMII signaling format proposed by Cisco Systems, Inc.

While device 136 may only be capable of operating as a single port device, the devices 134 and 136 may be configured for communicating in a common single port data transmission mode. If the devices 134 and 136 are capable of operating in more than one single port data transmission mode (e.g., each device is capable of operating in 1000BASE-X and SGMII data transmission modes), the devices 134 and 136 may be configured according to a "highest common denominator" data transmission mode selected according to an a priori prioritization scheme. PMA and PCS sections of the devices 134 and 136 associated with the selected single port data transmission mode may then be enabled to configure the devices to communicate according to the selected data transmission mode in the data lane 138.

FIG. 5 shows a system 140 comprising a device 144 coupled to four devices 146 by data lanes 148 in a DDI 142 according to an embodiment. Each of the four devices 146 may comprise a single port device coupled to the device 144 by a corresponding data lane 148. In one embodiment, each of the four devices 146 may comprise an individual port integrated in a single multi-port device. In the presently illustrated embodiment, the device 144 may be selectively configured to operate in a plurality of data transmission modes such as, for example, a XGXS data transmission mode to communicate as an XGXS device to another XGXS device over data lanes forming a XAUI, or a single port data transmission mode (e.g., 1000BASE-X or SGMII) to communicate with one or more single port devices.

According to an embodiment, one of the devices 146 may comprise a negotiation section (not shown) which is coupled to the device 144 by a predetermined primary data lane 148 and is capable of configuring each device 146 to communicate according to a selected common data communication mode. For example, the negotiation section may enable PMA and PCS sections in each device 146 associated with the selected data communication mode.

Figure 6:
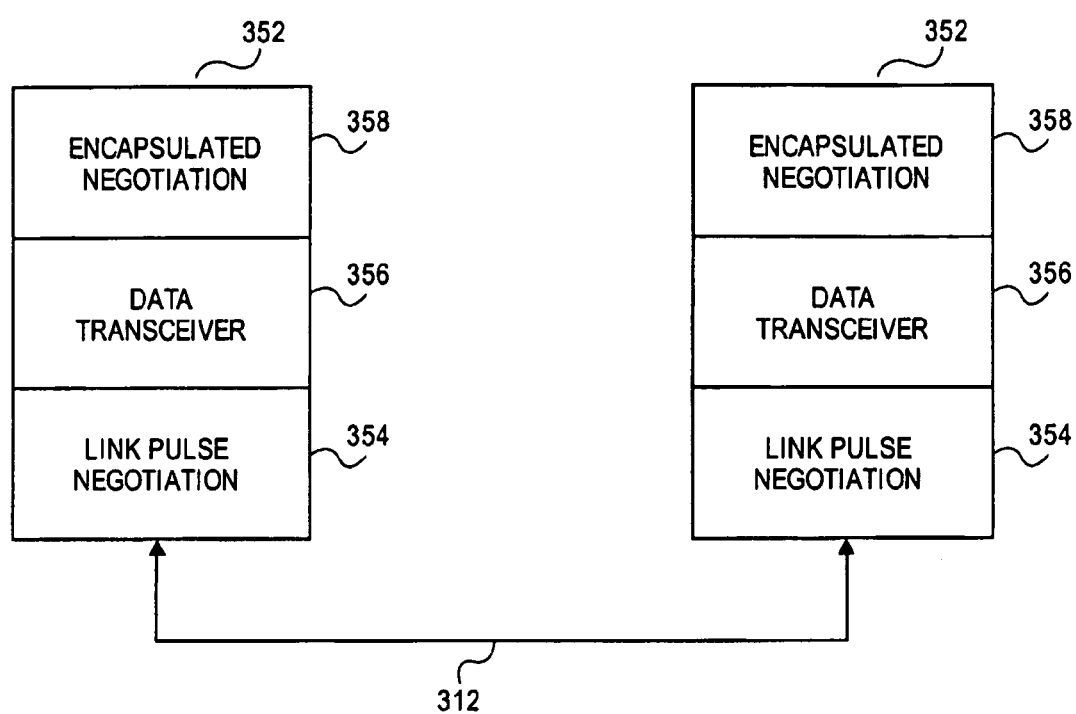
FIG. 6 shows a schematic diagram of devices capable of encapsulated autonegotiation of an operational mode following negotiation of a data transmission mode in a DDI using a link pulse signal.

FIG. 6 shows a schematic diagram of devices capable of encapsulated autonegotiation of an operational mode following negotiation of a data transmission mode in a DDI using link pulses according to an embodiment of the present invention as illustrated with reference to FIGS. 1 and 2. Devices 352 are coupled by one or more data lanes (not shown) in a DDI 312. Each device 352 comprises a link pulse negotiation section 354, data transceiver 356 and encapsulated negotiation section 358. The link pulse negotiation section 354 of each device 352 may select a data transmission mode from among one or more common data transmission modes (i.e., data transmission modes common to the data transceivers 356) and configure the data transceivers 356 to communicate in a selected common data transmission mode as shown in FIG. 1. The selected data transmission mode may define an encapsulated negotiation process such as 1000BASE-X as provided in IEEE Std. 802.3-2000, clause 37. For example, during a negotiation period the link pulse negotiation sections 354 may enable PMA and PCS sections (not shown) in the data transceivers 356 to configure the data transceivers 356 to communicate in the selected data communication mode. Following the negotiation period, encapsulated negotiation sections 358 may identify additional capabilities (e.g., in a protocol layer defined above a PMA section) while communicating according to the selected data transmission mode. However, this is merely an example of how an encapsulated negotiation scheme may be executed following configuration of a data transceiver according to a selected data transmission mode and embodiments of the present invention are not limited in this respect.

Figure 7:
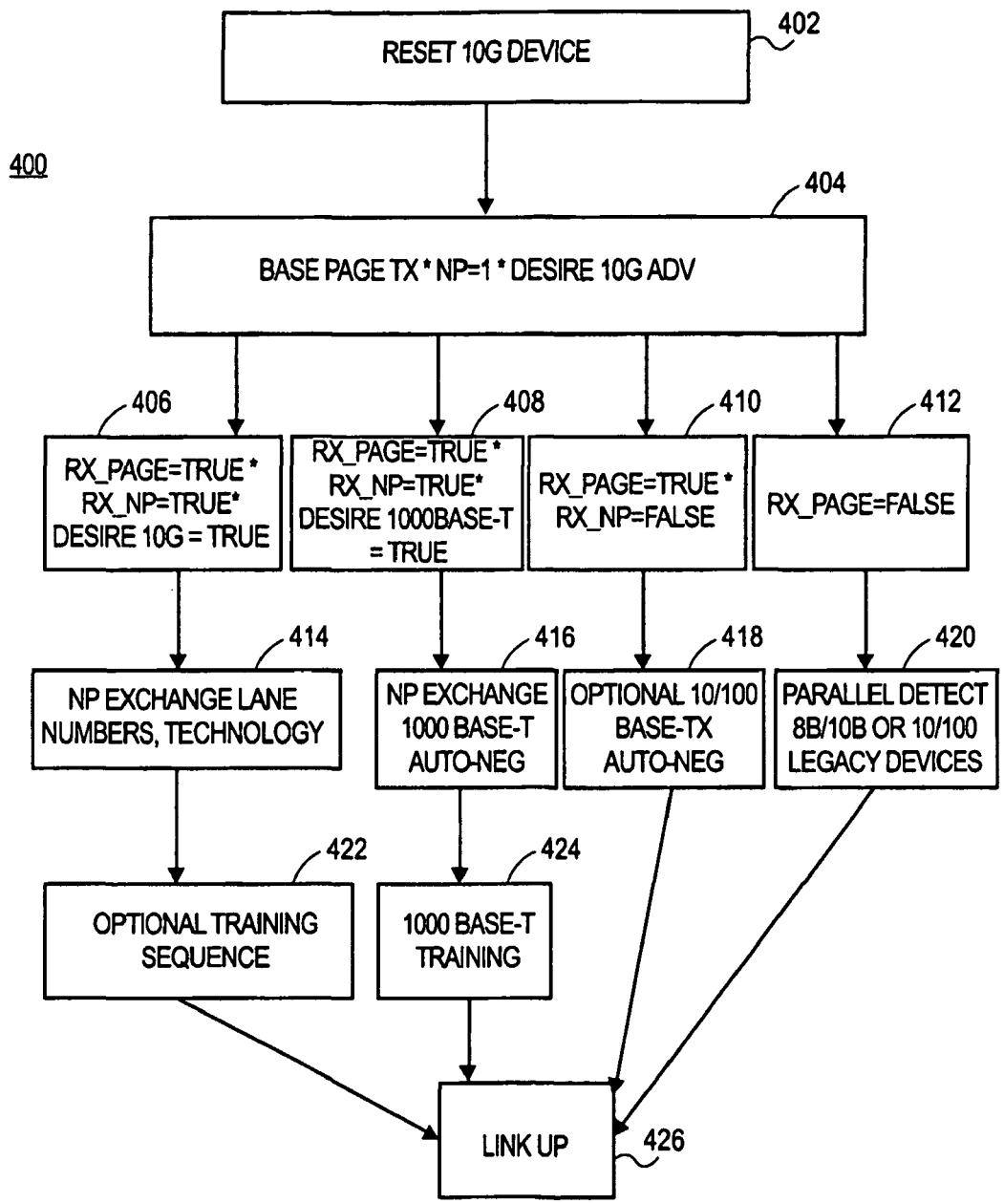
FIG. 7 shows a state diagram illustrating a process for negotiating a data transmission mode in a DDI according to an alternative embodiment.

FIG. 7 shows a state diagram illustrating a process 400 of negotiating a data transmission mode between devices coupled by a DDI according to an alternative embodiment of the devices 124, 134 and 144 shown in FIGS. 3 through 5. Following a reset event 402, a device may transmit a Base Page message in a fast link pulse signal over a data lane at state 404. For example, the device may transmit a Base Page message as shown in Table 1 below, indicating in a last bit "NP" whether a Next Page message is to follow.

TABLE 1

| S0 | S | S | S | S | A | A | A | A | A | A | A | RF | Ack | NP |
|----|---|---|---|---|---|---|---|---|---|---|---|----|-----|----|

Following transmission of the Base Page message, the device may transmit a Next Page message to indicate a desire to use the highest throughput data transmission mode (e.g., 10 Gbps serially or over XAUI). In one embodiment, an unformatted Next Page message encode data transmission capabilities consistent with IEEE Std. 802.3-2000, Clause 28.2.3.4.1 as illustrated in Table 2. However, this is merely an example embodiment and other differently encoded Next Page messages may be used to express data transmission capabilities.

TABLE 2

| Bit | Data Transmission Mode | No. of Data Lanes |
|-----|------------------------|-------------------|
| U0 | 1000BASE-X | 1 |
| U1 | 10GBASE-X4 (4 × 3.125 Gbps) | 4 |
| U2 | Serial 10 Gbps | 1 |
| U3 | 1000BASE-X (X2) | 2 |
| U4 | 1000BASE-X (X4) | 4 |
| U5 | SGMII | 1 |
| U6 | SGMII (X2) | 2 |
| U7 | SGMII (X4) | 4 |
| U8:10 | Reserved | |

If a response shown at state 406 is received from a device coupled to the DDI, additional Next Page messages may be exchanged at state 414 to establish lane numbers and/or technology to be used in a 10 Gbps data transmission mode (e.g., identification of serial 10 Gbps or lane numbering for XAUI). If a response shown at state 408 is received (i.e., indicating an ability to communicate according to 1000 BASE-T over one or more data lanes), additional Next Page messages may be exchanged for 1000 BASE-T autonegotiation according to IEEE Std. 802.3-2000, Clause 28. If a response shown at state 410 is received (i.e., indicating a response to the Base Page message but no response to the Next Page message), optional 10/100BASE-TX autonegotiation may commence at state 418 according to IEEE Std. 802.3-2000, Clause 28.

According to an embodiment, legacy devices that do not support autonegotiation may be coupled to a DDI and are therefore incapable of responding to a Base Page message as indicated at state 412. Accordingly, a parallel detect function may be employed at state 420 to enable communication according to a legacy data transmission mode over a single data lane (e.g., 1000BASE-X) or multiple data lanes (e.g., XAUI or multiple links of 1000BASE-X or SGMII). For example, in the absence of receiving a Base Page message, 8B/10B code groups may be received on one or more data lanes during a negotiation period. By counting a number of 8B/10B code groups received on each of four data lanes over the negotiation period, the legacy device may be identified as a legacy XGXS device (e.g., 8B/10B code groups detected at a bit rate of 3.125 Gbps on each of four data lanes) that does not support autonegotiation. Similarly, by counting a smaller number of 8B/10B code groups received on each of the four data lanes over the negotiation period, the legacy device may be identified as a legacy 1000BASE-X device or legacy SGMII device. Here, received 8B/10B code groups may be independently counted on each data lane to determine whether there are multiple legacy 1000BASE-X or SGMII devices (e.g., one or four devices as illustrated with reference to FIGS. 4 and 5) coupled to multiple data lanes.

According to an embodiment, the DDI 122, 132 and 142 illustrated in FIGS. 3 through 5 may be used for transmitting management data input/output (MDIO) messages in registers in either IEEE Std. 802.3-2002, Clause 22 or 45. Such messages may include, for example, control, status, phy identifier, master-slave control register, master-slave status register. In one embodiment, MDIO registers may be provided to the device 124, 134 or 144 to remap data lanes of a XAUI link to different pins coupled to a DDI. In another embodiment, MDIO registers may be provided to modify capabilities that may be advertised in a Next Page message as illustrated in Table 2. For example, the MDIO registers may be set to eliminate one or more capabilities that a device may otherwise advertise in such a Next Page message illustrated in Table 2.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system, comprising:
   (a) a media independent interface;
   (b) auto-negotiation circuitry to couple to multiple data lanes of a printed circuit board having conductive traces providing the multiple data lanes, each of the multiple data lanes to carry respective encoded symbol values; and
   (c) interposed between and coupled to the media independent interface and the auto-negotiation circuitry, multiple sets of PHY components, each set comprising:
      (1) a physical coding section (PCS); and
      (2) a physical medium attachment (PMA) section; coupled to the PCS;
   wherein the auto-negotiation circuitry comprises logic configured to:
      send transmission capabilities encoded as bits in a link base code word to a partner device coupled to the printed circuit board, the transmission capabilities including at least one 1-Gigabit/second capability, at least one 10-Gigabit/second capability, and at least one four-data lane communication capability over the printed circuit board wherein the auto-negotiation circuitry sends transmission capabilities over a single of the four-data lanes;

receive transmission capabilities encoded as bits in a link base code word from the partner device;

select a highest common denominator transmission capability according to a priority scheme of the transmission capabilities sent to the partner device and the transmission capabilities received from the partner device; and configure transmit and receive functions of the multiple sets of PHY components based on the selected highest common denominator transmission capability.

2. The system of claim 1, further comprising:
   a first media access control (MAC) device coupled to the media independent interface; and
   a packet classification ASIC (Application Specific Integrated Circuit).

3. The system of claim 1, further comprising circuitry for a parallel detect function to enable communication with a device that does not support auto-negotiation.

4. The system of claim 1, wherein the system comprises a line card, the line card having an input port to receive network data from a remote network node not coupled to the printed circuit board.

5. The system of claim 4, wherein the input port comprises an input port for an optical data link.

* * * * *